Aug. 26, 1941. H. C. FRENCH Re. 21,885

TILTABLE BOTTOM CABLE OPERATED SCRAPER

Original Filed Oct. 19, 1939 3 Sheets-Sheet 1

TILTABLE BOTTOM CABLE OPERATED SCRAPER

Original Filed Oct. 19, 1939 3 Sheets-Sheet 2

INVENTOR
H. C. French
BY
Morsell, Lieber & Morsell
ATTORNEYS.

Aug. 26, 1941. H. C. FRENCH Re. 21,885

TILTABLE BOTTOM CABLE OPERATED SCRAPER

Original Filed Oct. 19, 1939 3 Sheets-Sheet 3

INVENTOR
H. C. French
BY
Morsell, Lieber & Morsell
ATTORNEYS.

Reissued Aug. 26, 1941

Re. 21,885

UNITED STATES PATENT OFFICE 21,885

TILTABLE BOTTOM CABLE OPERATED SCRAPER

Henry C. French, Elm Grove, Wis., assignor to The Heil Co., Milwaukee, Wis., a corporation of Wisconsin Original No. 2,229,241, dated January 21, 1941, Serial No. 300,187, October 19, 1939. Application for reissue July 7, 1941, Serial No. 401,340

36 Claims. (Cl. 37—126)

My present invention relates generally to improvements in the art of moving dirt, and relates more specifically to various improvements in the construction and operation of scrapers for digging, hauling and spreading earth such as sand, gravel, ground or the like.

Generally defined, an object of my present invention is to provide an improved scraper which is simple in construction and efficient in use when operating on various kinds of soil.

Numerous different types of so-called dig and carry scrapers have heretofore been proposed and used commercially with more or less success, but all of these prior scraper assemblages have encountered difficulty in loading certain material such as gravel, since the smooth and round stones constituting such material tend to prevent tight closing of the confining space and roll out of the load confining chamber or bowls with great rapidity. This difficulty is primarily due to the fact that in the previous assemblages, the front load confining bowl or apron which cooperates with the cutting blade to confine and build up the load, coacts with this blade above its cutting edge, and therefore permits an intervening layer of stones to lodge between these elements and thus prevents tight closing of the gap.

It is therefore one of the more specific objects of my present invention to provide improved instrumentalities for obviating the above mentioned difficulty, and for permitting effective loading of a carrier scraper with gravel or other material having similar characteristics.

Among the prior dig and carry scrapers, we also find various modes of discharging the loads either with the aid of hydraulic jacks or with cables coacting with sheaves and a winch. In one of the prior scrapers having a load confining bowl provided with a cutting blade and a front apron cooperable with the blade, a forwardly movable endgate is provided within the bowl, and both the front apron and the rear endgate are operable by means of a single cable. Because of the fact that the upright rear endgate of this prior assemblage must be moved approximately horizontally over a horizontally disposed fixed bowl bottom, it is difficult to discharge the load when the material is packed, without utilizing great force and necessarily unduly stressing the various parts. It has also been heretofore proposed to provide a scraper assemblage of the type having a front load confining apron cooperable with a scraper blade, wherein the integral bottom and a rear wall constituting load supporting parts, are tiltable as a unit to deliver the load resting thereon over the blade, both the front apron and the unitary bottom and rear wall being operable by means of a single cable. While this type of prior assemblage has advantages over the movable rear endgate type, in that the tilting of the load supporting bottom permits more effective discharge of the loads under all conditions, the simultaneous tilting of the rear wall which is formed integral with the tiltable bottom is still objectionable because it produces a corner at the junction of these elements in which packed dirt can accumulate, and it also requires additional power to tilt the rear wall with the bottom.

In my prior application Serial No. 294,047, filed September 9, 1939, I have shown and described a dig and carry scraper of the type having a front apron and a tiltable bottom with integral rear wall, operable by means of a single cable which coacts with the tilting bottom and rear wall through a link suspended from a travelling sheave movable along an upwardly and forwardly inclined guide rail disposed centrally above the load confining space. This improved operating mechanism has proven highly satisfactory and advantageous in tilting the load confining, supporting and discharging elements with minimum power, but the use of a rear wall formed integral with the bottom is still objectionable in this prior assemblage for the reasons herein above indicated.

It is therefore another specific object of the present invention to provide an improved dig and carry scraper having a front load confining apron and from which the loads may be most effectively discharged with minimum effort by merely tilting the load supporting bottom.

A further specific object of my present invention is to provide a scraper in which the load confining space is bounded by opposite sides, and a rear end wall fixedly associated with a transportable frame, and wherein the bottom of the space above is readily tiltable to more effectively deliver loads of various materials forwardly over a scraper blade.

An additional specific object of the invention is to provide a new and useful dig and carry scraper wherein a transportable scraper blade is cooperable with front and rear tiltable load confining members which are devoid of objectionable dirt retaining corners and are most effectively and easily operable to deliver the loads, while being returnable to normal position by gravity.

Another specific object of the present invention is to provide various improvements in the construction and operation of scrapers of the type forming the subject of my prior application Serial No. 294,047, filed September 9, 1939, and some of the novel features of cable operated dig and carry scrapers shown, but not specifically claimed in the present application, form the subject of my said prior application.

The above and other specific object and advantages obtainable with my present invention, will be apparent from the following detailed description.

A clear conception of the several features constituting my present invention, and of the mode of constructing and of utilizing a dig and carry scraper built in accordance with the improvement, may be had by referring to the drawings accompanying and forming a part of this specification wherein like reference characters designate the same or similar parts in the various views.

While the improvements have been shown and described herein as being embodied in a cable operated scraper of the dig and carry type having a front apron for confining the loads, it is not intended to thereby unnecessarily restrict the scope or utility of the invention.

Figure 1:
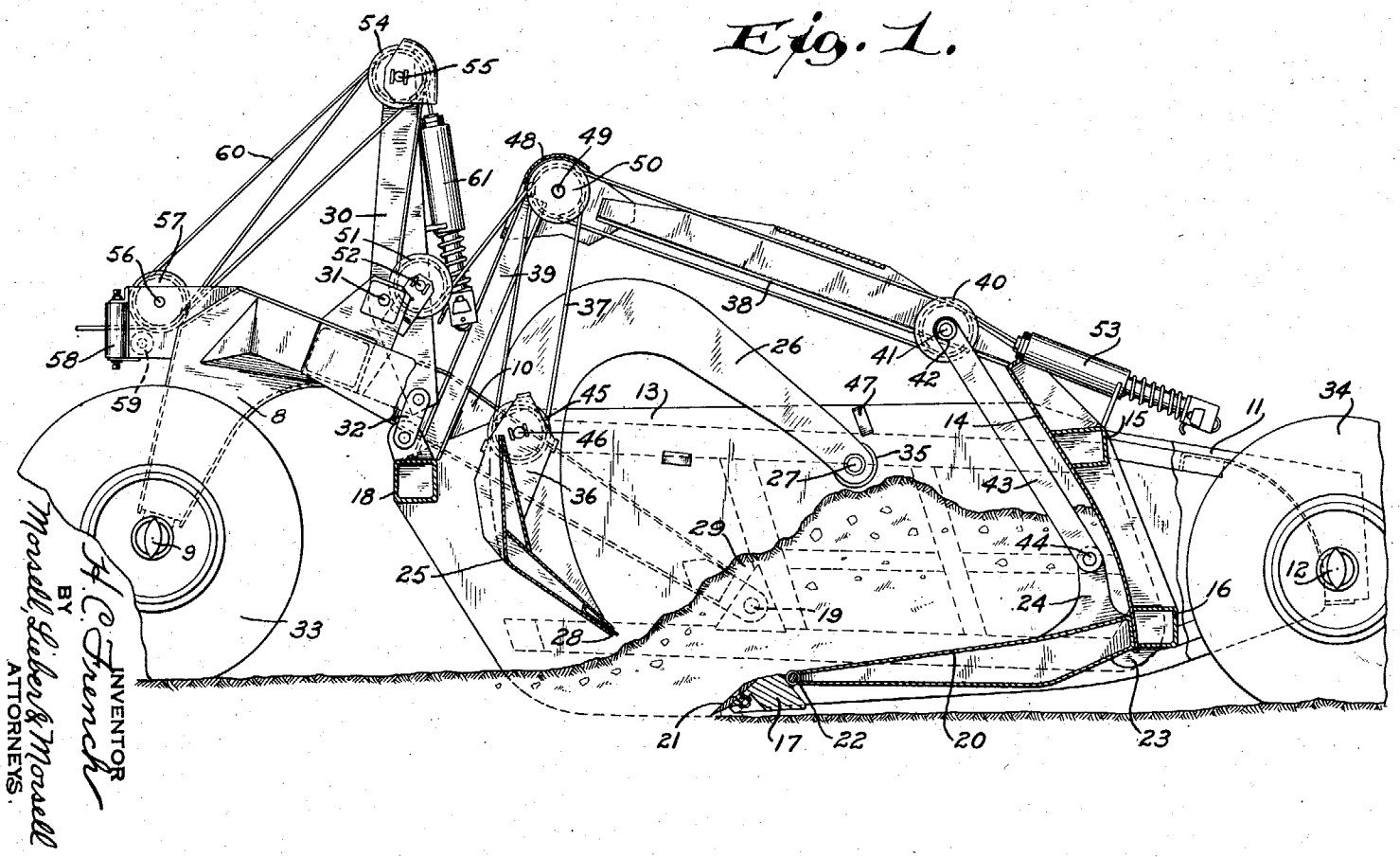
Fig. 1 is a central longitudinal vertical section through one of my improved dig and carry scrapers, showing the parts thereof in normal scraping or cutting and loading position.
Figure 2:
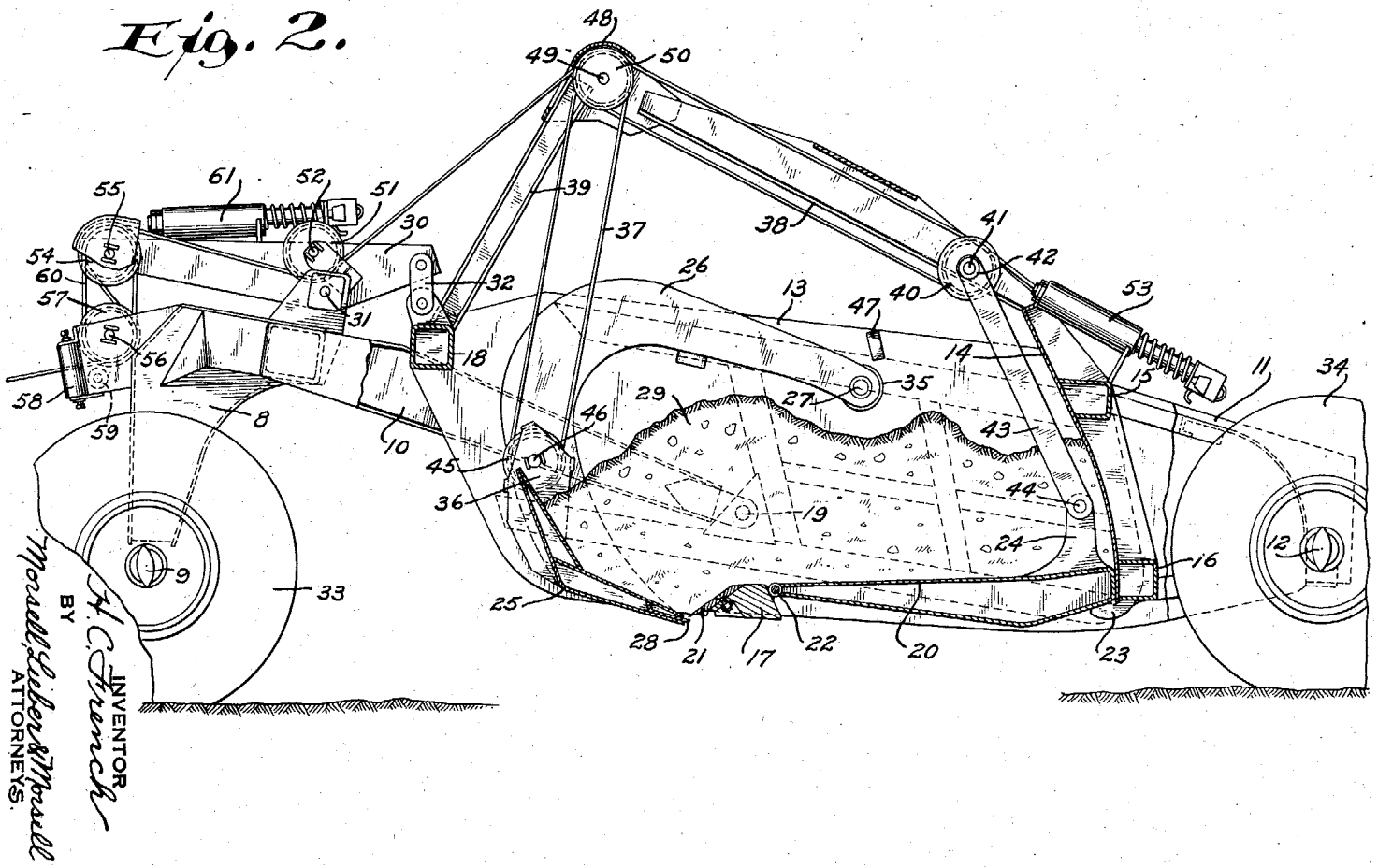
Fig. 2 is a similar longitudinal sectional view showing the parts in load confining and transporting position.
Figure 3:
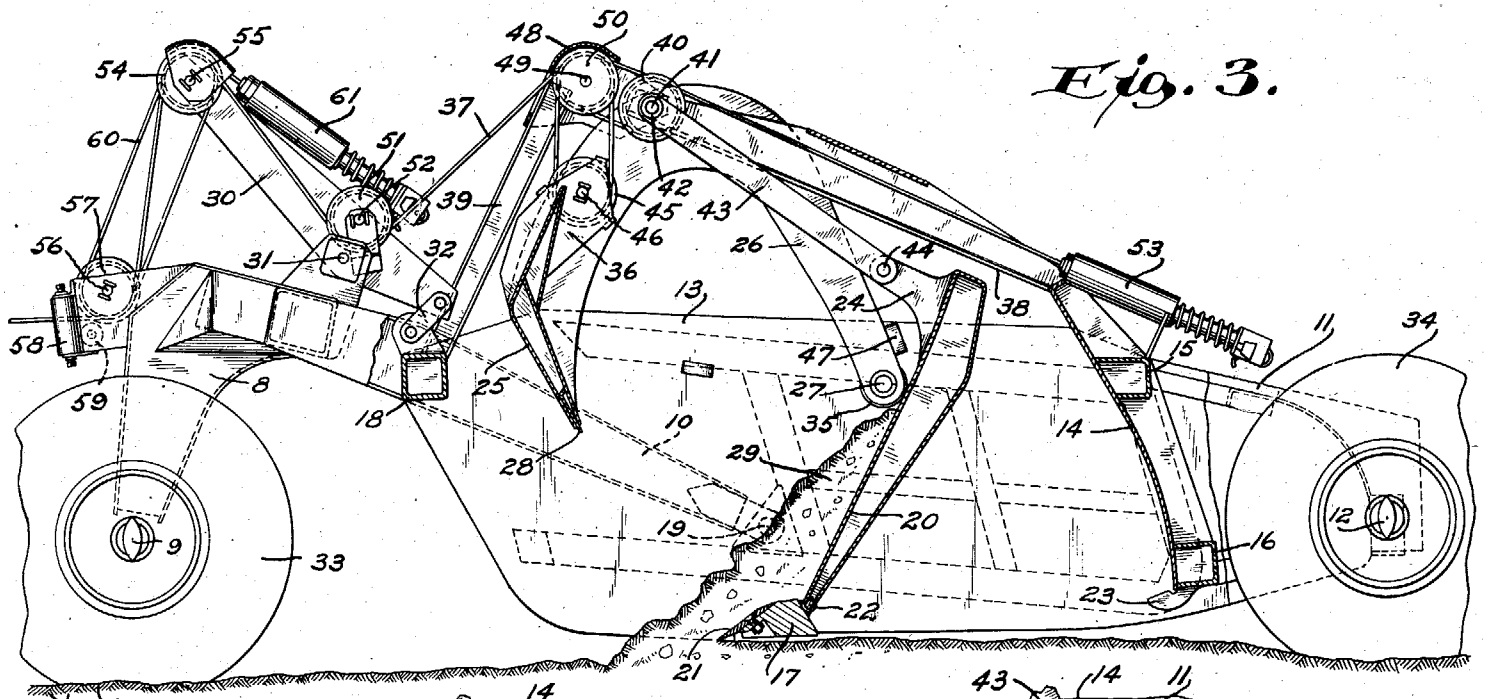
Fig. 3 is another similar longitudinal sectional view, showing the parts in load discharging and spreading position.

Referring to Figs. 1 to 3 inclusive of the drawings, the improved dig and carry scraper shown therein by way of illustration, comprises in general a sturdy front frame 8 transportable by and swingably supported upon a front wheel supported carriage 9, and having laterally separated rearwardly and downwardly extending integral side arms 10; a sturdy rear frame 11 transportable by and swingably mounted upon a rear wheel supported carriage 12, and having laterally separated forwardly extending integral opposite side walls 13 disposed between the rear ends of the front frame arms 10 and rigidly interconnected by means of a curved rear wall 14 having upper and lower cross-beams 15, 16 respectively associated therewith, and by front cross-beams 17, 18 located forwardly of the wall 14 to provide an open bottom; alined pivot pins 19 articulably interconnecting the rear ends of the front frame arms 10 with the medial outer portions of the rear frame side walls 13; a flat load supporting bottom plate 20 pivotally suspended at its front from the front lower cross-beam 17 in close proximity to the transverse scraper or cutting blade 21 carried by this beam, by means of a pivot shaft 22, the plate 20 having its rear end engageable with lugs 23 secured to the lower rear beam 16 and swingable upwardly along the curved rear wall 14, and also having a bracket 24 rigidly attached to its medial rear portion; a front load confining apron 25 having integral opposite side arms 26 disposed between and swingably suspended from the side walls 13 of the rear frame 11 by means of alined pivot pins 27, and having its lower cut-off edge 28 cooperable with and swingable beneath the cutting edge of the blade 21 to confine material 29 within the space bounded by the walls 13, 14 above the bottom plate 20; a frame section articulating lever 30 swingably suspended from the front frame 8 by means of a pivot shaft 31, and having its rear end connected to the medial portion of the upper front cross-beam 18 by a set of links 32 and pivot pins; mechanism for effecting articulation of the frames 8, 11 to raise and lower the cutting blade 21 and the load confining elements; and other mechanism for raising and lowering the apron 25 and bottom plate 20 independently of the elevation of the blade.

The front and rear frames 8, 11, the bottom plate 20, and the apron 25 should be formed of durable sheet metal welded or otherwise firmly united to produce rigid structures, and the front carriage 9 is transportable on wheels 33 while the rear carriage 12 is transportable upon similar wheels 34. The front carriage 9 may be provided with the usual draw bar adapted for convenient attachment to a tractor, and the front frame 8 is of rigid box-beam construction and of sufficient height to permit the wheels 33 to clear when making sharp turns. The rear frame 11 is swingable in a vertical plane about the axle of the rear carriage 9, and the side and end walls 13, 14 should be abundantly reenforced by ribs and braces in order to prevent distortion or deflection thereof. The rear end wall 14 is rigidly united with the opposite side walls 13, and the latter are additionally firmly united by the cross-beams 15, 16, 17, 18, so that a sturdy load confining chamber is produced in spite of the fact that the bottom of the rear frame 11 is open except for the closure produced by the tiltable bottom plate 20.

The load supporting bottom plate 20 should be of durable construction and should have a flat top surface devoid of dirt catching corners, so that when the plate 20 is tilted upwardly, the swinging end thereof will scrape dirt deposits from the curved surface of the fixed rear wall 14, and as this plate reaches its maximum tilted position the load will be effectively discharged by gravity. In order to enhance the discharge of sticky material from the plate 20, the rear ends of apron carrier arms 26 may be provided with bumper blocks 35 which may also form stops for the upward swinging movement of the plate, and against which the bottom plate may be caused to impinge. The upwardly swinging bottom plate 20 will also scrape dirt deposits from the side walls 13, and any particles which fall through the slight gaps between the bottom plate and the walls 13, 14 or over the swinging end of the plate 20, will fall to the ground through the open bottom of the rear frame 11. The top of the fixed rear wall 14 is preferably directed forwardly and is of sufficient height to prevent material from passing thereover until after the load confining space has been filled to capacity. The lower front cross-beam 17 from which the bottom plate 20 and blade 21 are suspended, must be of very sturdy construction, and the blade 21 may be made reversible.

The front apron 25 is of improved construction in that the cut-off blade or edge 28 thereof is adapted to pass beneath the cutting edge of the blade 21 as shown in Fig. 2 of the drawings, in order to prevent escape of material from the load confining zone. This feature is especially useful in loading gravel, since it prevents stones from lodging between the apron edge 28 and blade 21 whereby closing of the gap between these elements might be prevented. The front of the apron 25 is provided with rigid ears 36, and the side arms 26 are preferably curved abruptly as shown, in order to avoid obstruction by the load to closing of the apron.

The mechanism for effecting swinging of the front apron 25 and of the bottom plate 20, is similar to that shown and described in my prior copending application Serial No. 294,047, and comprises a single cable 37 which first raises the apron 25 and subsequently tilts the plate 20 to discharge the load. The rear frame 11 is provided with a set of upwardly and forwardly inclined guideways or tracks 38 the lower rear ends of which are rigidly attached to the medial portion of the fixed rear wall 14, and the front upper ends of which are firmly supported from the upper front cross-beam 18 by means of outwardly inclined struts 39. A pair of cable sheaves 40 are carried by a shaft 41 supported on rollers 42 which are adapted to roll or travel along the tracks 38, and the travelling shaft 41 is connected to the bracket 24 at the rear of the bottom plate 20 by means of links 43 and a pivot pin 44. The sheaves 40 are obviously simultaneously movable along the tracks 38, and when these sheaves are moved upwardly and forwardly they will tilt the bottom plate 20, as clearly shown in Fig. 3. The front apron 21 has a single cable sheave 45 journalled between the integral ears 36 thereof by means of a shaft 46, and is adapted to be swung about its pivot pins 27 from closed or lowered position as shown in Fig. 2, to raised or fully elevated position as shown in Fig. 3 wherein it may be caused to engage stop lugs 47 on the side walls 13. The upper front ends of the rails or tracks 38 may be secured to the struts 39 by a rigid bracket 48 in which a shaft 49 is mounted, and a set of four alined sheaves 50 is rotatably mounted upon the shaft 49. Another sheave 51 may be mounted upon the frame elevating and lowering lever 30 by means of a journal shaft 52, and the single cable 37 coacts successively with the sheave 51, one sheave 50, the sheave 45, another sheave 50, one sheave 40, still another sheave 50, with the other sheave 40, and finally with the fourth sheave 50, and has its rear end secured to the rear frame 11 by a cable connector 53; so that a pull on the cable 37 will first elevate the apron 25 and will thereafter swing the plate 20 upwardly, while release of the pull will cause gravity to first lower the plate 20 and thereafter lower the apron 25.

Mounted upon the forward swinging end of the lever 30 is another set of alined sheaves 54 which are journalled on the shaft 55, and the single cable 37 after passing forwardly in contact with the sheave 51 may be caused to coact with one of these sheaves 54. A shaft 56 which is carried by the forward upper portion of the front frame 8 provides a journal support for still another set of sheaves 57; and the actuating cable 37 for the apron 25 and bottom plate 20, after passing over the floating sheave 51, coacts with one of the sheaves 57 and extends forwardly between guide rollers 58, 59 to the hoisting winch located on the propelling tractor near the driver's seat. With this arrangement of sheaves and cable, the single cable 37 may not only be utilized to successively fully elevate or tilt the apron 25 and bottom plate 20, but it may also be used to swing these elements to any desired intermediate position.

The mechanism for relatively swinging the front and rear frames 8, 11 about the pivot shafts 19, comprises a second cable 60 which extends rearwardly from the hoist or winch on the tractor, and after coacting with the guide rollers 58, 59, this cable 60 passes successively about the sheaves 57, 54 and finally has its end secured to another cable connector 61 carried by the arm or lever 30. This assemblage is such, that when a pull is exerted on the cable 60, the lever 30 will be swung about its pivot shaft 31 from the position shown in Fig. 1 or Fig. 3, to that shown in Fig. 2, thereby swinging the frames 8, 11 relatively to each other about the pivot shafts 19 and elevating the cutting blade 21; and when the pull on the cable 60 is released, gravity acting upon the rear frame 11 and associated parts and material 29, will cause the scraper blade 21 to lower more or less toward the ground, and will also swing the front end of the lever 30 upwardly.

By virtue of the fact that the cable 37 which actuates the front apron 25, coacts with the sheaves 51, 54 carried by the swinging lever 30, the apron 25 will also be affected by raising and lowering of the cutting blade 21, independently of its operation by the cable 37. This secondary movement of the apron 25 is such that the material 29 will be most effectively retained within the load confining zone as the blade 21 is raised and lowered.

Figure 5:
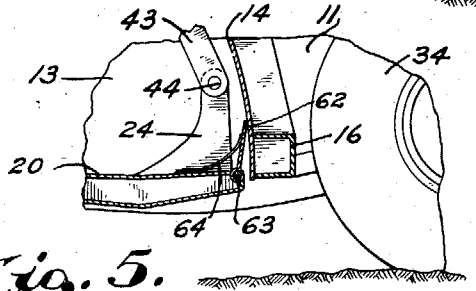
Fig. 5 is a similar fragment showing a similar flap spring pressed against the rear load confining wall.
Figure 4:
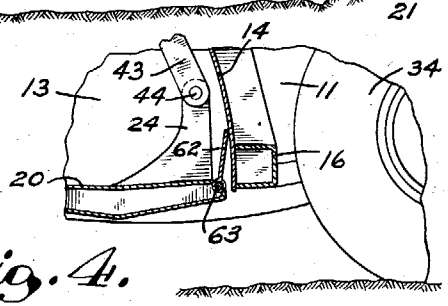
Fig. 4 is a fragment of the rear load confining assemblage, showing a scraper flap associated with the rear end of the tiltable bottom.

While the load supporting bottom plate 20 of Figs. 1 to 3 inclusive has its rear end directly cooperable with the curved and fixed rear wall 14, without the provision of any sealing means, it may in some cases be desirable to provide means for sealing the gap between the bottom plate 20 and the wall 14. In Fig. 4, I have shown the rear swinging end of the plate 20, provided with a flap 62 swingably suspended from the plate 20 by means of a pivot pin 63 and having its upper edge formed for scraping engagement with the rear wall 14. While the scraper flap 62 may be held in proper engagement with the wall 14 by the material 29, I may also provide one or more leaf springs 64 secured to the bottom plate 20 and coacting with the flap 62 in order to resiliently retain this flap in scraping engagement with the wall 14, as shown in Fig. 5.

During normal operation of the improved scraper, the front and rear frames 8, 11 may be relatively adjusted so as to either lower the cutting blade 21 into the ground as shown in Fig. 1 for loading purposes; or this blade may be elevated to the position shown in Fig. 2 for load carrying purposes; or the frames may be positioned as shown in Fig. 3 for the purpose of permitting discharge and spreading of the material 29. When the assemblage is in the position illustrated in Fig. 1 and the scraper is being advanced along the ground, the material 29 will enter the load confining space and will pile up upon the bottom plate 20 and against the side walls 13 and the fixed rear end wall 14. If the material 29 should reach a height above the upper extremity of the rear wall 14 the inclination of this wall will cause the dirt to travel forwardly toward the front apron 25, and will thus prevent spilling of dirt over the rear wall 14. Any slight quantities of material which may escape at the edges and rear of the bottom plate 20, will obviously fall to the ground since the space beneath this plate is open. During the scraping operation, the front apron 25 should be elevated more or less, so as to confine the accumulated material 29 within the load confining zone, and the front apron should preferably be gradually lowered as the load accumulates so as to insure most effective confinement.

When the load confining zone has been properly filled with material 29, the front apron 25 may be completely lowered to the position shown in Fig. 2 wherein the lower edge 28 of the apron 25 is disposed beneath and closely adjacent to the cutting blade 21. In order to thus lower the apron 25, it is only necessary to release the pull on the cable 37, whereupon the apron will drop by gravity. The scraper with its confined load may then be transported over ground without permitting escape of any of the material 29 until it becomes desirable to discharge the load from within the confining zone.

In order to discharge and to uniformly spread the material 29, it is preferable to somewhat lower the cutting blade 21 to a position such as shown in Fig. 3, and this may be done by merely somewhat releasing the pull on the cable 60. When the blade 21 has been properly positioned, the cable 60 may be held in fixed position, and the cable 37 may then be actuated to subsequently elevate the front apron 25 to its extreme uppermost position with the arms 26 thereof against the stops 47. Subsequent pull on the cable 37 will cause the plate 20 to swing upwardly and forwardly about its pivot shaft 22, thereby delivering the material 29 over the scraper blade 21 and onto the ground. During this tilting of the plate 20, the rollers 42 will ride upwardly along the rails 38 and will cause the links 43 to positively tilt the plate 20. As this plate reaches its uppermost position of tilting, it may be caused to impinge against the bumper blocks 35 so as to remove adhering dirt from the upper surfaces of the plate, and when plate 20 moves upwardly along the wall 14, it will obviously remove adhering material from this fixed wall. As the material 29 is delivered onto the ground, the advancement of the scraper will cause the blade 21 to effectively spread the material evenly over the ground.

When the load has been fully discharged from the confining zone, the pull on the cable 37 may be released, whereupon the plate 20 will first be restored to lowered or approximately horizontal position, after which the front apron 25 will likewise be lowered due to the action of gravity. Because of the fact that the plate 20 cannot be swung any farther than is permitted by the bumper blocks 35, and also because of the inclination of the rails 38, the plate 20 will quickly drop to its lowered position in engagement with lugs 23 when the pull on the cable is released. The fact that the front apron 25 is suspended from the pivot pins 27 by means of long arms 26, will also cause the apron 25 to drop rapidly when the cable pull is released, and by causing the lower edge 28 of the apron 25 to pass beneath the cutting edge of the blade 21, material is prevented from lodging between the apron and blade so that the load will be most effectively confined.

From the foregoing detailed description it will be apparent that the improved scraper may be most effectively utilized to load and confine the material 29 and to thereafter discharge and spread the same. All of the operations of the machine may be quickly and effectively accomplished with the aid of only two cables, and by effecting discharge of the load by merely tilting the bottom plate 20, it will be apparent that the load may be most effectively discharged with minimum effort. The important features of the present invention as distinguished from my prior application hereinabove referred to, are the formation of the apron 25 so that it will close beneath the cutting edge of the blade, and the discharge of the material by tilting the bottom plate 20 alone. The travelling sheave and rail mechanism for effecting tilting of the bottom plate 20 has been found most advantageous because it permits tilting of the plate with very little effort. The provision of a fixed rear wall 14 also materially enhances the strength of the rear frame 11, and while the flaps 62 for removing material from this rear wall are not absolutely necessary, they may in some cases be desirable. The improved machine can obviously be readily manipulated from a propelling tractor and besides being very durable in construction, is also simple in construction and highly efficient in use. By virtue of the fact that the load supporting bottom plate is flat and cooperates with a rearwardly and downwardly inclined fixed end wall, this scraper has considerably greater load carrying capacity than prior scrapers wherein the rear wall is formed integral with the bottom, and the movement of the plate 20 along the fixed rear end gate or wall prevents accumulation of material on this wall.

It should be understood that it is not desired to limit this invention to the exact details of construction or to the precise mode of use, herein shown and described, for various modifications within the scope of the claims may be apparent to persons skilled in the art.

I claim:

1. A scraper comprising, a frame transportable along the ground and having a transverse cutting blade and opposite side walls forming a load confining zone in proximity to said blade, and an apron swingably suspended from said walls and being movable between said side walls toward said blade to confine the load within said zone, said apron having its lower edge disposable beneath the cutting edge of said blade and cooperating with said walls to effect load confinement.

2. A scraper comprising, a frame transportable along the ground and having a transverse cutting blade and opposite side walls rigidly attached to said blade and forming a load confining zone, and a front apron swingably suspended from said walls and being movable downwardly and rearwardly between said side walls toward said blade to confine the load within said zone, said apron having its lower transverse edge swingable beneath and closely adjacent to the cutting edge of said blade and constantly cooperating with said walls to effect load confinement.

3. A scraper comprising, a transportable frame having opposite side portions rigidly connected by a fixed upwardly and forwardly curved rear wall, a scraper blade interposed between said side portions forwardly of said wall, and a relatively flat bottom plate hingedly supported near said blade and having its rear end swingable along and in close proximity to said wall.

4. A scraper comprising, a transportable frame having opposite side portions rigidly connected by a fixed upwardly and forwardly curved rear wall, a scraper blade interposed between said side portions forwardly of said wall, a relatively flat bottom plate hingedly supported near said blade and having its rear end swingable along and in close proximity to said wall, and means operable from the front of said frame for swinging said bottom plate to dump material over said blade.

5. A scraper comprising, a transportable frame having opposite side walls rigidly connected by a fixed upwardly extending curved rear wall, a scraper blade rigidly connecting said side walls forwardly of said rear wall, and a relatively flat bottom plate hingedly suspended from said frame near said blade and having its rear end swingable along and in close proximity to said curved wall between said side walls.

6. A scraper comprising, a transportable frame having opposite side walls rigidly connected by a fixed upwardly extending curved rear wall, a scraper blade rigidly connecting said side walls forwardly of said rear wall, a relatively flat bottom plate hingedly suspended from said frame near said blade and having its rear end swingable along and in close proximity to said curved wall between said side walls, and operating means manipulable from the front of said frame for tilting said bottom plate to deliver material over said blade.

7. A scraper comprising, a transportable frame having opposite side portions connected by a rigid rear wall provided with a curved surface, a scraper blade mounted on said frame forwardly of said wall, and a relatively flat bottom plate hingedly suspended near said blade and having its rear end swingable along and in close proximity to the curved surface of said wall.

8. A scraper comprising, a transportable frame having a scraper blade, a wall suspended from said frame rearwardly of said blade and having a curved front surface generated about the blade as an approximate center, and a bottom plate hingedly suspended near said blade and having its rear end swingable along and in close proximity to said surface.

9. A scraper comprising, a transportable frame having rigid side walls and a blade connecting the lower portions thereof, a rear wall rigidly connecting said side walls rearwardly of said blade and having a curved front surface generated about the blade as an approximate center, and a bottom plate hingedly suspended from said frame near said blade and having its rear end swingable along and in close proximity to said curved surface.

10. A scraper comprising, a transportable frame having a scraper blade, a wall suspended from said frame rearwardly of said blade and having a curved front surface generated about the blade as an approximate center, a bottom plate hingedly suspended near said blade and having its rear end swingable along and in close proximity to said surface, and mechanism disposed centrally above said plate and comprising parts movable longitudinally of said frame for swinging said bottom plate to dump material over said blade.

11. A scraper comprising, a transportable frame having a transverse scraper blade, a transverse wall suspended from said frame parallel to said blade and having a curved load confining surface facing the blade and generated thereabout as an approximate center, and a relatively flat load supporting plate pivotally suspended near said blade and having its swinging end movable along and in close proximity to said surface 12. A scraper comprising, a transportable frame having a transverse scraper blade and a fixed load confining wall disposed parallel to said blade, a relatively flat bottom plate hingedly suspended near said blade and having its swinging end movable along and in close proximity to said wall, a track carried by said frame centrally above said plate, a sheave movable along said track and being connected to the swinging end of said plate, and means for advancing said sheave along said track.

13. A scraper comprising, a transportable frame having a transverse scraper blade and a fixed load confining wall disposed parallel to said blade, a relatively flat bottom plate hingedly suspended near said blade and having its swinging end movable along and in close proximity to said wall, a track carried by said frame centrally above said plate, an element rollable along said track, a link pivotally connected to said element and to the swinging end of said bottom plate, and means for advancing said element along said track.

14. A scraper comprising, a transportable frame having rigid side walls and a blade connecting the lower portions thereof, a rear wall rigidly interconnecting said side walls remote from said blade and having a curved front load confining surface, a relatively flat bottom plate pivotally suspended from said frame near said blade and having its rear end swingable in close proximity to and along said surface, a track carried by said frame between said side walls and above said bottom plate, a sheave movable along said track and being articulably connected to the rear of said plate, and a cable for advancing said sheave along said track to swing said bottom plate.

15. A scraper comprising, a transportable frame having rigid side walls and a blade connecting the lower portions thereof, a rear wall rigidly interconnecting said side walls remote from said blade and having a curved front load confining surface, a relatively flat bottom plate pivotally suspended from said frame near said blade and having its rear end swingable in close proximity to and along said surface, a track carried by said frame between said side walls and above said bottom plate, a sheave movable along said track, a link pivotally attached to said sheave and to the rear end of said bottom plate, and a cable for advancing said sheave along said track to tilt said bottom plate.

16. A scraper comprising, a transportable frame having a transverse scraper blade and an upwardly extending forwardly inclined fixed rear wall, a relatively flat bottom plate hingedly suspended near said blade and having its rear end swingable along and in close proximity to said fixed wall, a forwardly extending upwardly inclined track carried by said frame centrally above said bottom plate, a sheave movable along said track, means articulably connecting said sheave with the rear end of said bottom plate, and a cable for advancing said sheave along said track to tilt said bottom plate.

17. A scraper comprising, a transportable frame having a transverse scraper blade and an upwardly extending forwardly inclined fixed rear wall, a relatively flat bottom plate hingedly suspended near said blade and having its rear end swingable along and in close proximity to said fixed wall, a forwardly extending upwardly inclined track carried by said frame centrally above said bottom plate, a sheave movable along said track, a forwardly extending upwardly inclined link pivotally attached to said sheave and to the rear swinging end of said bottom plate, and a cable for advancing said sheave along said track to tilt said bottom plate through said link.

18. A scraper comprising, a transportable frame having a transverse scraper blade and a fixed load confining wall disposed parallel to said blade, a relatively flat bottom plate hingedly suspended near said blade and having its swinging end movable upwardly along said wall, and a scraper flap carried by said swinging plate end and engaging the adjacent surface of said wall.

19. A scraper comprising, a transportable frame having a transverse scraper blade and a fixed wall disposed parallel to said blade and provided with a curved load confining surface generated about the blade as an approximate center, a relatively flat bottom plate pivotally suspended near said blade and having its swinging end movable along said surface, and a scraper flap interposed between said plate and said surface.

20. A scraper comprising, a transportable frame having a transverse scraper blade and a fixed wall disposed parallel to said blade and provided with a curved load confining surface generated about the blade as an approximate center, a relatively flat bottom plate pivotally suspended near said blade and having its swinging end movable along said surface, and a scraper flap pivotally suspended from the swinging end of said plate and coacting with said curved surface.

21. In combination, a transportable frame, a load carrying element tiltable relative to said frame, a track carried by said frame directly over said element and intermediate the width thereof, a sheave movable along said track and being secured to said element remote from the axis of tilting of the latter, and means for advancing said sheave along said track to tilt said element to discharge the load therefrom.

22. In combination, a transportable frame having a cutting blade rigidly attached thereto, a load carrying element forming a movable bottom, said element being pivotally attached to said frame near said blade, a track carried by said frame centrally above said bottom forming element, a sheave movable along said track, a link connecting said sheave with said bottom forming element remote from the pivotal axis of the latter, and means for advancing said sheave along said track to tilt said bottom forming element about said axis.

23. In combination, a transportable frame having a cutting blade rigidly attached thereto, a load carrying element forming a bottom swingable relative to said frame about an axis disposed near said blade, an inclined track carried by said frame directly over said element and intermediate the width thereof and extending upwardly and forwardly from the rear of said element, a sheave movable along said track and being connected to the rear portion of said element remote from said axis, and means for moving said sheave upwardly along said track to tilt said element about said axis.

24. In combination, a transportable frame, a load carrying element forming a bottom tiltable relative to said frame, a track carried by said frame centrally above said element, a sheave movable along said track and being secured to said element remote from the axis of tilting of the latter, another sheave journalled at an end of said track, and a cable coacting with said sheaves to advance said movable sheave along said track and thereby tilt said element.

25. In combination, a transportable frame having a cutting blade rigidly attached thereto, a load carrying element forming a bottom pivotally attached to said frame near said blade, a track carried by said frame directly over said element and intermediate the width of the element, a sheave movable upon rollers along said track, a link connecting said sheave with said element remote from the pivotal axis of the latter, a second sheave fixedly journalled to said track, and a cable coacting with said sheaves to advance said movable sheave along said track and thereby tilt said element about said axis.

26. In combination, a transportable frame having a cutting blade rigidly attached thereto, a load carrying element forming a bottom swingable relative to said frame about an axis disposed near said blade, an inclined track carried by said frame directly over said element and intermediate the width of said element and extending upwardly and forwardly from the rear of said element, a sheave movable along said track and being connected to the rear portion of said element remote from said axis, a sheave rotatable about a fixed axis near the upper end of said track, and a cable cooperating with said sheaves to advance said movable sheave along said track toward the other sheave and thereby tilt said element about said axis.

27. In combination, a transportable frame, a load carrying element forming a bottom movable relative to said frame, a track carried centrally above said frame, sheaves movable along said track and being connected to said element, and a cable for advancing said sheaves along said track to move said element relative to said frame.

28. In combination, a transportable frame, a load carrying element forming a bottom tiltable upon said frame, a track supported by said frame centrally above said element, sheaves movable along said track and being connected to said element remote from its axis of swing, rollers supporting said movable sheaves upon said track, and a cable for advancing said sheaves along said track to tilt said element relative to said frame.

29. In combination, a transportable frame having opposite side walls rigidly interconnected by a transverse front beam member and by a transverse rear forwardly and upwardly inclined plate member, a scraper blade interposed between said side walls rearwardly of said beam and forwardly of said plate member, and a load carrying element forming a movable bottom pivotally supported near said blade and having a rear upper edge swingable along and in close proximity to said plate member to remove material from contact with said plate member.

30. In combination, a transportable frame having opposite side walls rigidly interconnected by a transverse front beam member and by a transverse rear forwardly and upwardly inclined plate member, a scraper blade interposed between said side walls rearwardly of said beam and forwardly of said plate member, a load carrying element forming a movable bottom pivotally supported near said blade and having a rear upper edge swingable along and in close proximity to said plate member to remove material from contact with said plate member, and means operable from the front of said frame for swinging said element to dump material over said blade.

31. In combination, a transportable frame having opposite side walls rigidly interconnected by a transverse front beam member and by a transverse rear forwardly and upwardly inclined plate member, a scraper blade interposed between said side walls rearwardly of said beam and forwardly of said plate member, a load carrying element forming a movable bottom pivotally supported near said blade and having a rear portion swingable along and in close proximity to said plate member, a track carried by said frame beam and plate member centrally above said element, a sheave movable along said track and being connected to said rear swinging portion of said element, and cable means for advancing said sheave along said track.

32. In combination, a transportable frame having opposite side walls rigidly interconnected by a transverse front beam member and by a transverse rear forwardly and upwardly inclined plate member, a scraper blade interposed between said side walls rearwardly of said beam and forwardly of said plate member, a load carrying element forming a movable bottom pivotally supported near said blade and having a rear portion swingable along and in close proximity to said plate member, an upwardly and forwardly inclined track carried by said frame beam and plate member centrally above said element, a sheave movable along said track, a link pivotally connected to said sheave and to said swinging rear portion of said element, and cable means for advancing said sheave along said track.

33. In combination, a wheel supported transportable frame having laterally spaced opposite side walls rigidly interconnected at the rear by a transverse forwardly and upwardly inclined plate member, a transverse scraper blade spanning the space between the lower portions of said walls forwardly of said plate member, a load carrying element forming a movable bottom pivotally suspended near said blade and having a rear scraper edge swingable along and in close proximity to said plate member to remove material from contact with said plate member, and cable means operable from the front of said frame for swinging said element to dump material over said blade.

34. In combination, a wheel supported transportable frame having laterally spaced opposite side walls rigidly interconnected at the rear by a transverse forwardly and upwardly inclined plate member, a transverse scraper blade spanning the space between the lower portions of said walls forwardly of said plate member, a load carrying element forming a movable bottom pivotally suspended near said blade and having a rear portion swingable along and in close proximity to said plate member, a track carried by said frame medially above said element and extending upwardly and forwardly from the top of said plate member, a sheave movable along said track and being connected to said rear of said element, and cable means for advancing said sheave along said track.

35. In combination, a wheel supported transportable frame having laterally spaced opposite side walls rigidly interconnected at the rear by a transverse forwardly and upwardly inclined plate member, a transverse scraper blade spanning the space between the lower portions of said walls forwardly of said plate member, a load carrying element forming a movable bottom pivotally suspended near said blade and having a rear portion swingable along and in close proximity to said plate member, a track carried by said frame medially above said element and extending upwardly and forwardly from the top of said plate member, a sheave movable along said track, a link pivotally connected to said sheave and to said rear of the element, and cable means for advancing said sheave along said track.

36. In combination, a wheel supported transportable frame having laterally spaced opposite side walls rigidly interconnected at the rear by a transverse forwardly and upwardly inclined plate member, a transverse scraper blade spanning the space between the lower portions of said walls forwardly of said plate member, a load carrying element forming a bottom pivotally suspended near said blade and having a rear portion swingable along and in close proximity to said plate member, a track carried by said frame medially above said bottom and extending upwardly and forwardly from the top of said plate member, a sheave movable along said track, a link pivotally connected to said sheave and to said rear of the element, another sheave journalled at the upper forward end of said track, and a cable coacting with said sheaves and being operable to advance said movable sheave and to thereby tilt said element.

HENRY C. FRENCH.